(12) United States Patent
Sarmah et al.

(10) Patent No.: US 9,306,747 B2
(45) Date of Patent: Apr. 5, 2016

(54) SYSTEM AND METHOD FOR SECOND FACTOR AUTHENTICATION

(71) Applicants: Dilip Sarmah, Fremont, CA (US); Kyle Warner Erickson, Orem, UT (US); Rajat Mounendrababu Gadagkar, Sangli (IN)

(72) Inventors: Dilip Sarmah, Fremont, CA (US); Kyle Warner Erickson, Orem, UT (US); Rajat Mounendrababu Gadagkar, Sangli (IN)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 13/759,243

(22) Filed: Feb. 5, 2013

(65) Prior Publication Data

US 2013/0148806 A1  Jun. 13, 2013

Related U.S. Application Data

(63) Continuation of application No. 12/398,331, filed on Mar. 5, 2009, now Pat. No. 8,380,989.

(51) Int. Cl.
*H04L 29/06* (2006.01)
*H04L 9/28* (2006.01)
*H04W 12/06* (2009.01)
*H04W 4/14* (2009.01)

(52) U.S. Cl.
CPC ............ *H04L 9/28* (2013.01); *H04W 12/06* (2013.01); *H04W 4/14* (2013.01)

(58) Field of Classification Search
CPC ..... H04L 9/28; H04L 63/0263; H04W 12/06; H04W 4/14; G06F 21/31
USPC ............... 380/255; 713/168, 172, 182, 185; 726/2, 16, 17, 20, 26, 27, 28
See application file for complete search history.

(56) References Cited

U.S. PATENT DOCUMENTS

| | | |
|---|---|---|
| 5,604,343 A | 2/1997 | Curry et al. |
| 5,760,385 A | 6/1998 | Curry et al. |
| 5,805,702 A | 9/1998 | Curry et al. |
| 5,832,207 A | 11/1998 | Little et al. |
| 5,940,510 A | 8/1999 | Curry et al. |
| 5,949,880 A | 9/1999 | Curry et al. |
| 6,021,494 A | 2/2000 | Bolan et al. |
| 6,064,740 A | 5/2000 | Curiger et al. |
| 6,105,013 A | 8/2000 | Curry et al. |
| 6,219,789 B1 | 4/2001 | Little et al. |
| 6,237,095 B1 | 5/2001 | Curry et al. |
| 6,678,828 B1 * | 1/2004 | Pham et al. ............. 726/2 |

(Continued)

OTHER PUBLICATIONS

Non-Final Rejection mailed Apr. 30, 2012 for U.S. Appl. No. 12/347,223, filed Dec. 31, 2008; 20 pages.

(Continued)

*Primary Examiner* — Sarah Su
(74) *Attorney, Agent, or Firm* — Sterne, Kessler, Goldstein & Fox P.L.L.C.

(57) ABSTRACT

As individuals increasingly engage in different types of transactions they face a growing threat from, possibly among other things, identity theft, financial fraud, information misuse, etc. and the serious consequences or repercussions of same. Leveraging the ubiquitous nature of wireless devices and the popularity of (Short Message Service, Multimedia Message Service, etc.) messaging, an infrastructure that enhances the security of the different types of transactions within which a wireless device user may participate through a Second Factor Authentication facility. The infrastructure may optionally leverage the capabilities of a centrally-located Messaging Inter-Carrier Vendor.

21 Claims, 7 Drawing Sheets

(56) References Cited

U.S. PATENT DOCUMENTS

| | | | |
|---|---|---|---|
| 6,993,325 B1 | 1/2006 | Waesterlid | |
| 7,114,175 B2 | 9/2006 | Lähteenmäki | |
| 7,154,901 B2 | 12/2006 | Chava et al. | |
| 7,283,812 B2 | 10/2007 | Blants et al. | |
| 7,343,496 B1 | 3/2008 | Hsiang et al. | |
| 7,516,483 B2* | 4/2009 | Brennan | 726/9 |
| 7,530,099 B2 | 5/2009 | Flurry et al. | |
| 7,539,309 B2 | 5/2009 | Stadelmann et al. | |
| 7,568,222 B2 | 7/2009 | Randle et al. | |
| 7,606,560 B2 | 10/2009 | Labrou et al. | |
| 7,644,171 B2 | 1/2010 | Sturniolo et al. | |
| 7,822,688 B2 | 10/2010 | Labrou et al. | |
| 7,945,240 B1 | 5/2011 | Klock et al. | |
| 7,996,888 B2 | 8/2011 | Asunmaa et al. | |
| 8,006,300 B2 | 8/2011 | Mizrah | |
| 8,010,783 B1 | 8/2011 | Cahill | |
| 8,019,362 B2 | 9/2011 | Sweatman et al. | |
| 8,027,304 B2 | 9/2011 | Forsberg | |
| 8,028,329 B2 | 9/2011 | Whitcomb | |
| 8,079,082 B2* | 12/2011 | Patel | 726/22 |
| 8,244,222 B2 | 8/2012 | Sanders et al. | |
| 8,374,636 B2 | 2/2013 | McDonough | |
| 8,380,989 B2 | 2/2013 | Sarmah et al. | |
| 8,521,137 B2 | 8/2013 | Spakota et al. | |
| 8,539,225 B2 | 9/2013 | Guo et al. | |
| 2002/0169988 A1* | 11/2002 | Vandergeest et al. | 713/201 |
| 2003/0018918 A1 | 1/2003 | Natsuno et al. | |
| 2003/0028621 A1 | 2/2003 | Furlong et al. | |
| 2003/0208697 A1 | 11/2003 | Gardner | |
| 2004/0006536 A1 | 1/2004 | Kawashima et al. | |
| 2004/0049455 A1 | 3/2004 | Mohsenzadeh | |
| 2005/0033994 A1* | 2/2005 | Suzuki | H04L 63/083 726/19 |
| 2005/0220064 A1 | 10/2005 | Hundscheidt et al. | |
| 2005/0246292 A1 | 11/2005 | Sarcanin | |
| 2006/0053296 A1 | 3/2006 | Busboom et al. | |
| 2006/0165060 A1 | 7/2006 | Dua | |
| 2007/0027775 A1 | 2/2007 | Hwang | |
| 2007/0033395 A1 | 2/2007 | MacLean | |
| 2007/0073817 A1* | 3/2007 | Gorty | 709/206 |
| 2007/0174080 A1 | 7/2007 | Outwater | |
| 2007/0220144 A1 | 9/2007 | Lovell | |
| 2007/0220595 A1 | 9/2007 | M'raihi et al. | |
| 2007/0240202 A1 | 10/2007 | Sullivan et al. | |
| 2008/0085700 A1 | 4/2008 | Arora | |
| 2008/0115198 A1* | 5/2008 | Hsu et al. | 726/5 |
| 2008/0178273 A1 | 7/2008 | Weber | |
| 2008/0207233 A1 | 8/2008 | Waytena et al. | |
| 2008/0222417 A1 | 9/2008 | Downes et al. | |
| 2008/0250035 A1 | 10/2008 | Smith | |
| 2008/0250477 A1* | 10/2008 | Samuelsson | H04L 9/321 726/4 |
| 2008/0261634 A1 | 10/2008 | Viana et al. | |
| 2008/0298588 A1* | 12/2008 | Shakkarwar | 380/255 |
| 2008/0313707 A1* | 12/2008 | Jain et al. | 726/2 |
| 2009/0070861 A1 | 3/2009 | Jain | |
| 2009/0132813 A1 | 5/2009 | Schibuk | |
| 2009/0152343 A1* | 6/2009 | Carter et al. | 235/379 |
| 2009/0198618 A1* | 8/2009 | Chan et al. | 705/66 |
| 2009/0220075 A1* | 9/2009 | Sidhu et al. | 380/45 |
| 2009/0239534 A1 | 9/2009 | Jang et al. | |
| 2009/0241175 A1 | 9/2009 | Trandal et al. | |
| 2009/0249497 A1 | 10/2009 | Fitzgerald et al. | |
| 2009/0265552 A1 | 10/2009 | Moshir et al. | |
| 2009/0276841 A1 | 11/2009 | Guo et al. | |
| 2009/0293112 A1* | 11/2009 | Moore et al. | 726/9 |
| 2010/0151823 A1 | 6/2010 | Dagorn et al. | |
| 2010/0167764 A1 | 7/2010 | Sarmah et al. | |
| 2010/0167765 A1 | 7/2010 | Sarmah et al. | |
| 2010/0169947 A1 | 7/2010 | Sarmah et al. | |
| 2010/0229225 A1 | 9/2010 | Sarmah et al. | |
| 2010/0250350 A1 | 9/2010 | Lovell, Jr. | |
| 2010/0281530 A1* | 11/2010 | Tarkoma | 726/9 |
| 2011/0191842 A1* | 8/2011 | Lindholm et al. | 726/9 |

OTHER PUBLICATIONS

Final Rejection mailed Dec. 17, 2012 for U.S. Appl. No. 12/347,223, filed Dec. 31, 2008; 22 pages.

Non-Final Rejection mailed Jul. 17, 2013 for U.S. Appl. No. 12/347,223, filed Dec. 31, 2008; 22 pages.

Non-Final Rejection mailed Jul. 7, 2011 for U.S. Appl. No. 12/347,354, filed Dec. 31, 2008; 18 pages.

Final Rejection mailed Dec. 22, 2011 for U.S. Appl. No. 12/347,354, filed Dec. 31, 2008; 22 pages.

Non-Final Rejection mailed Dec. 31, 2012 for U.S. Appl. No. 12/347,354, filed Dec. 31, 2008; 30 pages.

Final Rejection mailed Jul. 15, 2013 for U.S. Appl. No. 12/347,354, filed Dec. 31, 2008; 44 pages.

Non-Final Rejection mailed Oct. 5, 2011 for U.S. Appl. No. 12/347,357, filed Dec. 31, 2008; 16 pages.

Final Rejection mailed May 1, 2012 for U.S. Appl. No. 12/347,357, filed Dec. 31, 2008; 18 pages.

Non-Final Rejection mailed Aug. 1, 2011 for U.S. Appl. No. 12/398,331, filed Mar. 5, 2009; 11 pages.

Non-Final Rejection mailed Jan. 10, 2012 for U.S. Appl. No. 12/398,331, filed Mar. 5, 2009; 22 pages.

Notice of Allowance mailed Oct. 12, 2012 for U.S. Appl. No. 12/398,331, filed Mar. 5, 2009; 7 pages.

Non-Final Rejection mailed Nov. 26, 2013 for U.S. Appl. No. 12/347,354, filed Dec. 31, 2008; 30 pages.

Final Rejection mailed Jun. 23, 2014 for U.S. Appl. No. 12/347,354, filed Dec. 31, 2008; 38 pages.

Notice of Allowance mailed Sep. 9, 2014 for U.S. Appl. No. 12/347,354, filed Dec. 31, 2008; 19 pages.

Dictionary.com definition of "intermediary" printed on Jun. 16, 2014.

Non-Final Rejection mailed May 23, 2014 for U.S. Appl. No. 12/347,357, filed Dec. 31, 2008; 17 pages.

Final Rejection mailed Oct. 22, 2014 for U.S. Appl. No. 12/347,357, filed Dec. 31, 2008, 21 pages.

Final Rejection mailed Jan. 2, 2014 for U.S. Appl. No. 12/347,223, filed Dec. 31, 2008; 33 pages.

Non-Final Rejection mailed Jun. 11, 2014 for U.S. Appl. No. 12/347,223, filed Dec. 31, 2008; 35 pages.

* cited by examiner

600

602

```
public String generateSFAToken (int desiredTokenLength)
{
    // Secure an instance of the random number generator ...
    Random randGen = new Random ();

// Get the next random number ...
    long randNextNo = randGen.nextLong ();
    String SFAToken = "" + randNextNo;

// Adjust token length as needed ...
    if (SFAToken.length >= desiredTokenLength)
    {
        SFAToken = SFAToken.substring (SFAToken.length -
            desiredTokenLength, SFAToken.length);
    }
    else
    {
        while (SFAToken.length < desiredTokenLength)
            SFAToken = "0" + SFAToken;
    }

// Exit ...
    return SFAToken;
}
```

FIG. 6

SYSTEM AND METHOD FOR SECOND FACTOR AUTHENTICATION

CROSS-REFERENCE TO RELATED APPLICATIONS

This application is a continuation of co-pending U.S. patent application Ser. No. 12/398,331, which was filed on Mar. 5, 2009 and is incorporated herein by reference in its entirety. U.S. patent application Ser. No. 12/398,331 is related to: U.S. patent application Ser. No. 12/347,354, filed Dec. 31, 2008 and entitled "System And Method For Message-Based Conversations", which is incorporated herein by reference in its entirety; U.S. patent application Ser. No. 12/347,357, filed Dec. 31, 2008 and entitled "System And Method For Enhanced Application Server", which is incorporated herein by reference in its entirety; and U.S. patent application Ser. No. 12/347,223, filed Dec. 31, 2008 and entitled "System And Method For Mobile User Authentication", each of which is incorporated herein by reference in their entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), etc.

2. Background of the Invention

As the 'wireless revolution' continues to march forward the importance to a Mobile Subscriber (MS)—for example a user of a Wireless Device (WD) such as a cellular telephone, a BlackBerry, a Palm Pilot, etc. that is serviced by a Wireless Carrier (WC)—of their WD grows substantially.

One consequence of such a growing importance is the resulting ubiquitous nature of WDs—i.e., MSs carry them at almost all times and use them for an ever-increasing range of activities.

Coincident with the expanding presence of WDs has been the explosive growth of messaging—a steady annual increase, year over year, in the number of (SMS, MMS, etc.) messages that have been exchanged by and between WDs. That steady increase shows no sign of abating. For example, as reported by the industry group CTIA (see ctia.org on the World Wide Web [WWW]) in the U.S. there were over 158 billion SMS messages sent during 2006 (representing a 95% increase over 2005) and there were over 2.7 billion MMS messages sent during 2006 (representing a 100% increase over 2005).

Concurrent with the positive progress that the 'wireless revolution' has enjoyed society has, sadly, suffered significant negative progress. Among other things as individuals increasingly engage in different types of transactions (such as, possibly inter alia, the facilitation, completion, etc. of a payment element of, for example, an on-line purchase; an account status [e.g., balance, available credit, etc.] inquiry; a funds or money transfer operation; etc.) over different channels or mediums (such as, for example, the WWW, etc.) with different organizations (such as, possibly inter alia, utility companies, financial institutions, on-line retailers, etc.) they face a growing threat from, possibly inter alia, identity theft, financial fraud, information misuse, etc. and the serious consequences or repercussions of same. For example, a study by Utica College's center for Identity Management and Information Protection (CIMIP) that included among other things an extensive review of U.S. Secret Service case files found that the median actual dollar loss for identity theft victims was $31,356.

The specific examples that were described above are illustrative only and it will be readily apparent to one of ordinary skill in the relevant art that numerous other examples are easily possible and indeed are fully within the scope of the present invention.

Given (1) the ubiquitous nature of WDs, (2) the popularity of (SMS, MMS, etc.) messaging, and (3) an expanding universe of threats it would be desirable to leverage WD-based messaging to enhance the security of the different types of transactions within which a MS may participate through the innovatory addition of a Second Factor Authentication (SFA) facility.

Aspects of the present invention facilitate such enhanced transaction security in new, creative, and unconventional ways and address various of the not insubstantial challenges that are associated with same.

SUMMARY OF THE INVENTION

In one embodiment of the present invention there is provided a method for enhanced transaction security wherein a request for enhanced security (concerning a transaction between a MS and a Third Party) is received and, following a range of processing activities, a SFA token is generated, preserved, and dispatched to the MS via a (SMS, MMS, etc.) message.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

FIG. 6 presents a Java™ programming language code sample that may be possible under one particular embodiment of aspects of the present invention.

Figure 1:
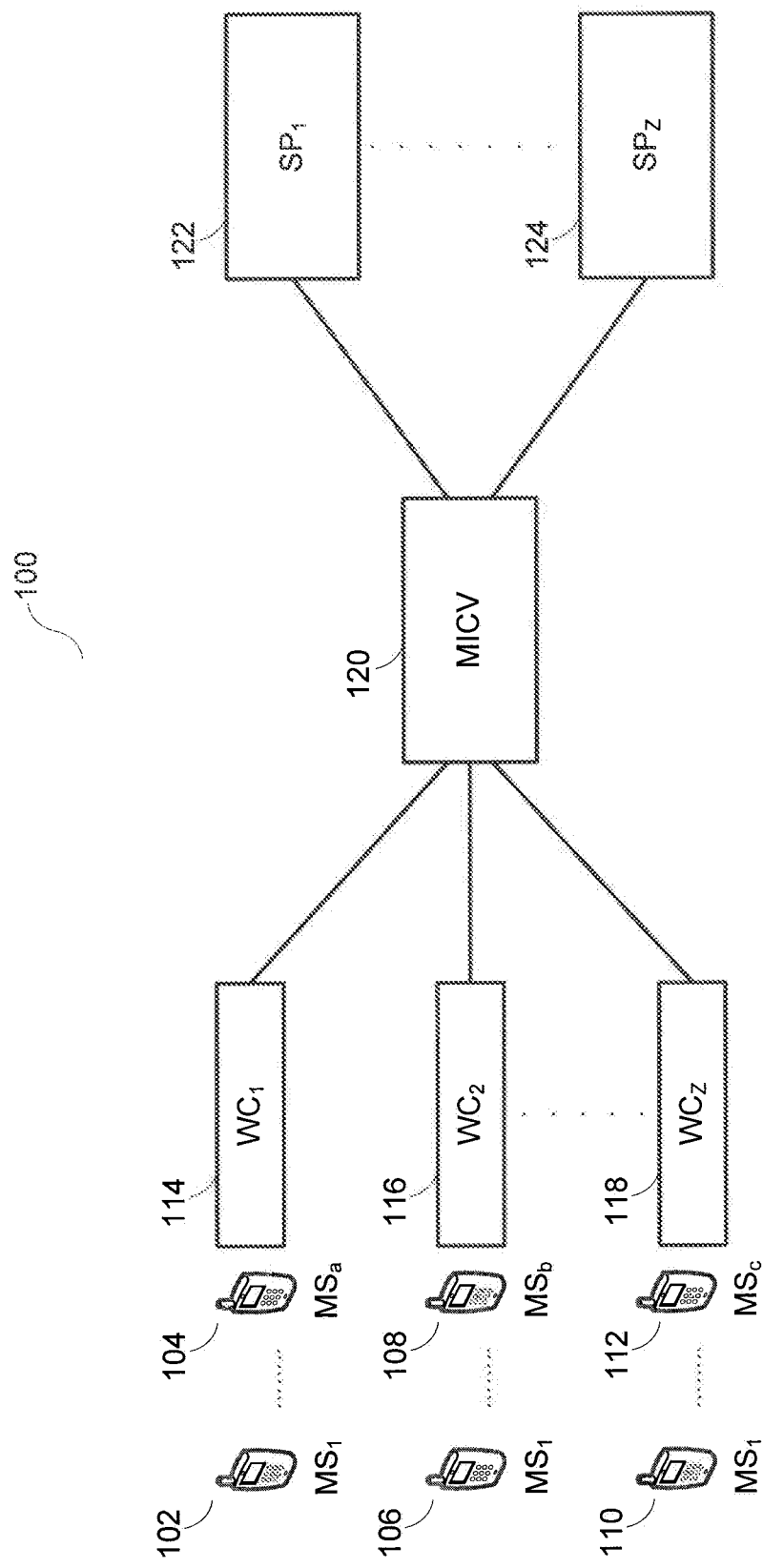
FIG. 1 is a diagrammatic presentation of an exemplary Messaging Inter-Carrier Vendor (MICV).

Throughout the drawings (a) like reference numbers generally indicate identical or functionally similar elements and (b) the left-most digit(s) of a reference number generally identify the drawing in which the reference number first appears. For example, in FIG. 4 reference numeral 318 would direct the reader to FIG. 3 for the first appearance of that element.

DETAILED DESCRIPTION

It should be noted that the embodiments that are described below are merely exemplary of the invention, which may be embodied in various forms. Therefore the details that are disclosed below are not to be interpreted as limiting but merely as the basis for possibly inter alia (a) teaching one of ordinary skill in the relevant art how to make and/or use the invention and (b) the claims.

The present invention may leverage the capabilities of a centrally-located, full-featured MICV facility. Reference is made to U.S. Pat. No. 7,154,901 entitled "Intermediary network system and method for facilitating message exchange between wireless networks," and its associated continuations, for a description of a MICV, a summary of various of the services/functions/etc. that are performed by a MICV, and a discussion of the numerous advantages that arise from same. U.S. Pat. No. 7,154,901 and its associated continuations are hereby incorporated by reference in their entirety.

As illustrated in FIG. 1 and reference numeral 100 a MICV 120 is disposed between, possibly inter alia:

1) Multiple WCs ($WC_1$ 114, $WC_2$ 116→$WC_Z$ 118) on one side, and

2) Multiple SPs ($SP_1$ 122→$SP_Z$ 124), entities that may possibly inter alia provide a range of services/products/etc. to MSs, on the other side and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS← →MS, MS← →SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that other arrangements are equally applicable and indeed are fully within the scope of the present invention.

In the discussion below aspects of the present invention will be described and illustrated as being offered by a SP (i.e., as noted above an entity that may possibly inter alia provide a range of services/products/etc. to MSs). A SP may, for example, be realized as an independent service bureau, an element of or within some organization (such as possibly inter alia a financial institution, a retail establishment, an on-line retailer, etc.), an element of a WC or a landline carrier, an element of a MICV, multiple entities (such as for example those just listed) or aspects of same working together, etc.

In the discussion below reference will be made to messages that are sent, for example, between a MS and a SP. As set forth below, a given 'message' sent between a MS and a SP may actually comprise a series of steps in which the message is received, forwarded, and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example—SP $SP_N$ offers a service that has been enhanced or augmented as provided through aspects of the instant invention and Mary, a MS, uses $SP_N$'s service.

Figure 2:
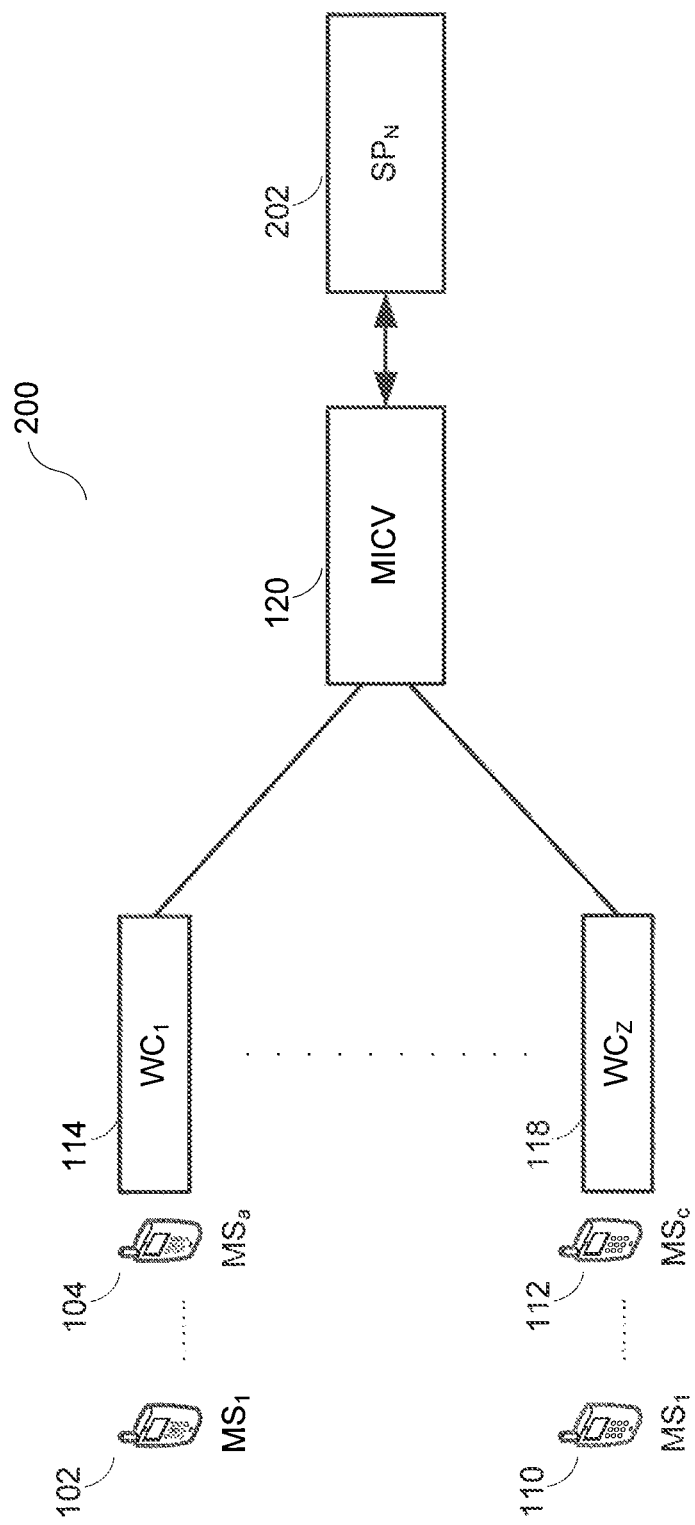
FIG. 2 illustrates one particular arrangement that is possible through aspects of the present invention.

FIG. 2 and reference numeral 200 depict one particular arrangement that may be possible under our hypothetical example. As indicated, all of the messaging traffic of numerous MSs ($MS_1$ 102→$MS_a$ 104 and $MS_1$ 110→$MS_c$ 112, including Mary), serviced by various WCs ($WC_1$ 114→$WC_Z$ 118), is exchanged with a MICV 120 and the MICV 120 is connected with $SP_N$ 202 (a SP that offers, possibly inter alia, aspects of the present invention).

Figure 3:
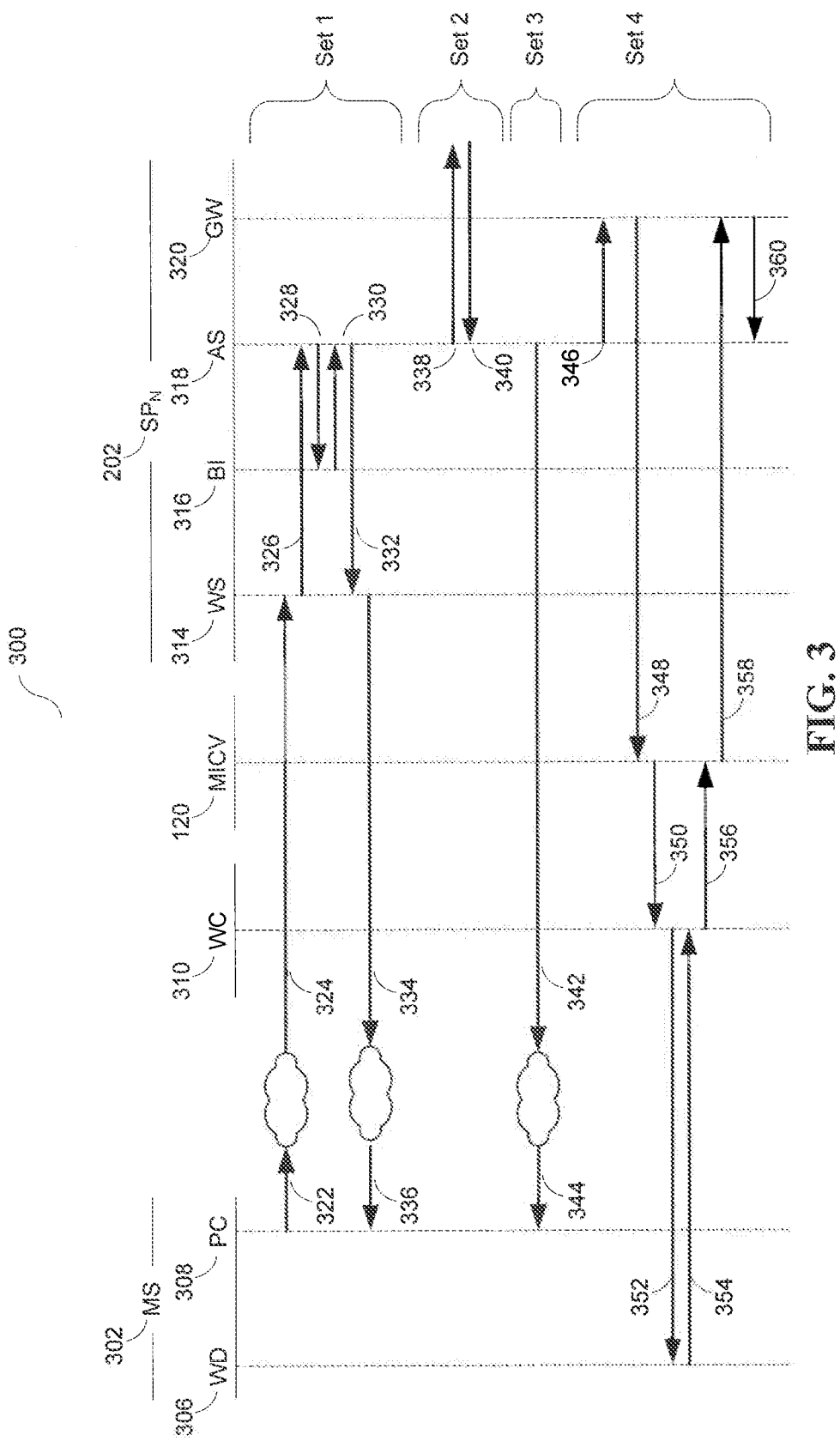
FIG. 3 illustrates various of the exchanges or interactions that are possible during an optional registration portion of the present invention.

FIG. 3 and reference numeral 300 illustrate various of the exchanges or interactions that might occur under an optional registration portion of our hypothetical example. Such a registration process may be tailored (e.g., the range of information gathered, the scope of services subsequently offered, etc.) to the class of user—e.g., possibly inter alia different types, categories, etc. of users may complete different registration processes. Additionally, a registration process may be supported or offered by any combination of one or more entities (e.g., a Third Party [3P] such as a financial institution, a retail establishment, an on-line retailer, an employer, a utility company, etc.; a SP; etc.). As well, some or all of the information that is collected during a registration process may be shared or exchanged between any combination of one or more entities (e.g., a SP, a 3P, etc.). Thus a MS may complete a (required or optional) registration process with any number of entities and aspects of the information that is collected during a given registration process may be shared or exchanged between any number of entities. The registration process that is depicted through FIG. 3 is supported or offered by a SP (specifically by $SP_N$ 202).

Of interest and note in FIG. 3 are the following entities:

MS 302 WD 306. For example, a mobile telephone, BlackBerry, PalmPilot, etc. belonging to Mary 302.

MS 302 Personal Computer (PC) 308. For example, a home, work, etc. PC of Mary 302.

WC 310. The provider of service for a WD 306 of Mary 302.

MICV 120. As noted above the use of a MICV, although not required, provides significant advantages.

SP$_N$ 202 Web Server (WS) 314. A publicly-available WWW site that is optionally provided by SP$_N$ 202.

SP$_N$ 202 Billing Interface (BI) 316. A single, consolidated interface that SP$_N$ 202 may use to easily reach, possibly inter alia, one or more internal and/or external entities such as a credit card or debit card clearinghouse, a carrier billing system, a service bureau that provides access to multiple carrier billing systems, invoicing or billing facilities, etc.

SP$_N$ 202 AS 318. Facilities that provide key elements of the instant invention (which will be described below).

SP$_N$ 202 Gateway (GW) 320. A facility through which SP$_N$ 202 may exchange possibly inter alia (SMS, MMS, etc.) messages with possibly inter alia a MICV 120.

It is important to note that while in FIG. 3 the MS 302 WD 306 and MS 302 PC 308 entities are illustrated as being adjacent or otherwise near each other, in actual practice the entities may, for example, be physically located anywhere.

In FIG. 3 the exchanges that are collected under the designation Set 1 represent the activities that might take place as Mary 302 completes a registration process with SP$_N$ 202:

A) Mary 302 uses one of her PCs 308 to visit a WS 314 of SP$_N$ 202 to, possibly among other things, complete a service registration process (see 322→324).

B) A WS 314 of SP$_N$ 202 interacts with an AS 318 of SP$_N$ 202 to, possibly among other things, commit some or all of the information that Mary 302 provided to one or more data repositories (e.g., a databases), optionally initiate a billing transaction, etc. (see 326).

C) As appropriate and as required a BI 316 completes a billing transaction (see 328→330).

D) After receiving a response from an AS 318 of SP$_N$ 202 (332) a WS 314 of SP$_N$ 202 responds appropriately (e.g., with the presentation of a confirmation message, etc.) (see 334→336).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the WWW, wireless messaging (SMS, MMS, etc.), Electronic Mail (E-Mail) messages, Instant Messaging (IM), conventional mail, telephone, an Interactive Voice Response (IVR) facility, etc.

During the registration process described above a range of information may be captured from a MS including, possibly inter alia:

A) Identifying Information. For example, possibly among other things, name, address, age, landline and wireless Telephone Numbers (TNs), E-Mail addresses, IM names/identifiers, a unique identifier and a password, etc.

B) Account Information. For example, possibly among other things, various of the particulars for one or more of a MS' accounts (with organizations such as, possibly inter alia, utility companies, financial institutions, on-line retailers, etc.). The particulars may include, possibly inter alia, organization name and contact details, account number, account access credentials, etc.

C) Security Service Information. For example, possibly among other things, the selection of one or more of the different security plans, programs, etc. that a SP may optionally offer (each of which may carry, possibly inter alia, some type of fee or charge). Such plans, programs, etc. may provide, possibly inter alia, alerts to a MS (via, for example, SMS, MMS, E-Mail, IM, etc.) based on various events, criteria, thresholds, etc.; additional levels of notification, confirmation, etc. during a transaction; etc.

D) Billing Information. For example, the particulars (such as, possibly inter alia, name, account/routing/etc. numbers, etc.) for financial institution (bank, brokerage, etc.) accounts, credit cards, debit cards, etc. As well, possibly the selection of one or more of the different service billing models may be offered by a SP (including, inter alia, a fixed one-time charge, a recurring [monthly, etc.] fixed charge, a recurring [monthly, etc.] variable charge, a per-transaction charge, etc.) and possibly the selection of one or more of the different payment mechanisms that may be offered by a SP (including, possibly among other things, credit or debit card information, authorization to place a charge on a MS's phone bill, authorization to deduct funds from a MS' [bank, brokerage, etc.] account, etc.).

The specific pieces of information that were described above are illustrative only and it will be readily apparent to one of ordinary skill in the relevant art that numerous other pieces of information (e.g., additional Identifying Information, scheduled daily/weekly/etc. reporting desired and/or on-demand reporting desired, etc.) are easily possible and indeed are fully within the scope of the present invention.

As noted above the information that Mary provided during the registration process may be preserved in a data repository (e.g., a database) and may optionally be organized as a MS Profile.

The content of Mary's profile may be augmented by SP$_N$ 202 to include, as just a few examples of the many possibilities, internal and/or external demographic, psychographic, sociological, etc. data.

As noted above, a SP's BI may optionally complete a billing transaction. The billing transaction may take any number of forms and may involve different external entities (e.g., a WC's billing system, a carrier billing system service bureau, a credit or debit card clearinghouse, a financial institution, etc.). The billing transaction may include, inter alia:

1) The appearance of a line item charge on the bill or statement that a MS receives from her WC.

2) The charging of a credit card or the debiting of a debit card.

3) The (electronic, etc.) transfer of funds.

4) The generation of an invoice, statement, etc.

In FIG. 3 the exchanges that are collected under the designation Set 2 represent the activities that might take place as SP$_N$ 202 optionally coordinates, etc. with one or more external entities to, possibly among other things, secure access, exchange and/or confirm collected information, arrange to receive updates, etc. (see 338→340). During such exchanges SP$_N$ 202 may employ any combination of one or more of possibly inter alia an Application Programming Interface (API), an interface layer, an abstraction layer, communication protocols, etc.

The specific exchanges that were described above (as residing, under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present invention.

In FIG. 3 the exchanges that are collected under the designation Set 3 represent the activities that might take place as an AS 318 of SP$_N$ 202 dispatches to Mary 302 one or more confirmation E-Mail messages (see 342→344).

The specific exchanges that were described above (as residing under the designation Set 3) are illustrative only and it will be readily apparent to one of ordinary skill in the relevant art that numerous other exchanges (including, inter alia, the dispatch of multiple E-mail messages [i.e., multiple instances of the sequence 342→344], the reply by Mary 302 to a received E-mail message, etc.) are easily possible and indeed are fully within the scope of the present invention.

In FIG. 3 the exchanges that are collected under the designation Set 4 represent the activities that might take place as an AS 318 of $SP_N$ 202 dispatches one or more confirmation SMS, MMS, etc. messages to a WD 306 of Mary 302 (346→352) and Mary 302 optionally replies or responds to the message(s) (354→360). Of interest and note are:

1) in the instant example the messages are shown traversing a MICV 120.

2) $SP_N$ 202 may employ a Short Code (SC) or a regular TN as its source address (and to which it would ask users of its service to direct any reply messages). While the abbreviated length of a SC (e.g., five digits for a SC administered by Neustar under the Common Short Code [CSC] program) incrementally enhances the experience of a MS 302 (e.g., Mary 302 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "Universal Short Code administration facility."

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to One of ordinary skill in the relevant art that numerous other exchanges are easily possible and indeed are fully within the scope of the present invention. For example, possibly inter alia, aspects of the registration information that was described above may subsequently be managed (e.g., existing information may be edited or removed, new information may be added, etc.) through any combination of one or more channels including, inter alia, a WWW facility, wireless messaging (SMS, MMS, etc.), E-Mail messages, IM exchanges, conventional mail, telephone, IVR facilities, etc. Additionally, aspects of the registration information may be exchanged with one or more entities (such as possibly inter alia a 3P such as a financial institution, a retail establishment, an on-line retailer, an employer, a utility company, etc.; another SP; etc.).

To continue with our hypothetical example . . . as Mary goes about her daily activities there may arise numerous instances where she engages in transactions and would like to enhance the security of those transactions. For example:

1) Mary may wish to determine the balance of one of her (bank, brokerage, credit card, etc.) accounts.

2) Mary may wish to complete the payment portion of a purchase (from, for example, an on-line retailer, etc.).

3) Mary may wish to transfer money between various of her (bank, brokerage, credit card, etc.) accounts, transfer money from one of her (bank, brokerage, credit card, etc.) accounts to someone else, transfer money to someone else (perhaps another MS) with the amount of the transfer (along with, for example, charges, fees, etc.) appearing on her WC statement, etc.

The specific examples that were cataloged above are illustrative only and it will be readily apparent to one of ordinary skill in the relevant art that numerous other examples are easily possible and indeed are fully within the scope of the present invention.

Figure 4:
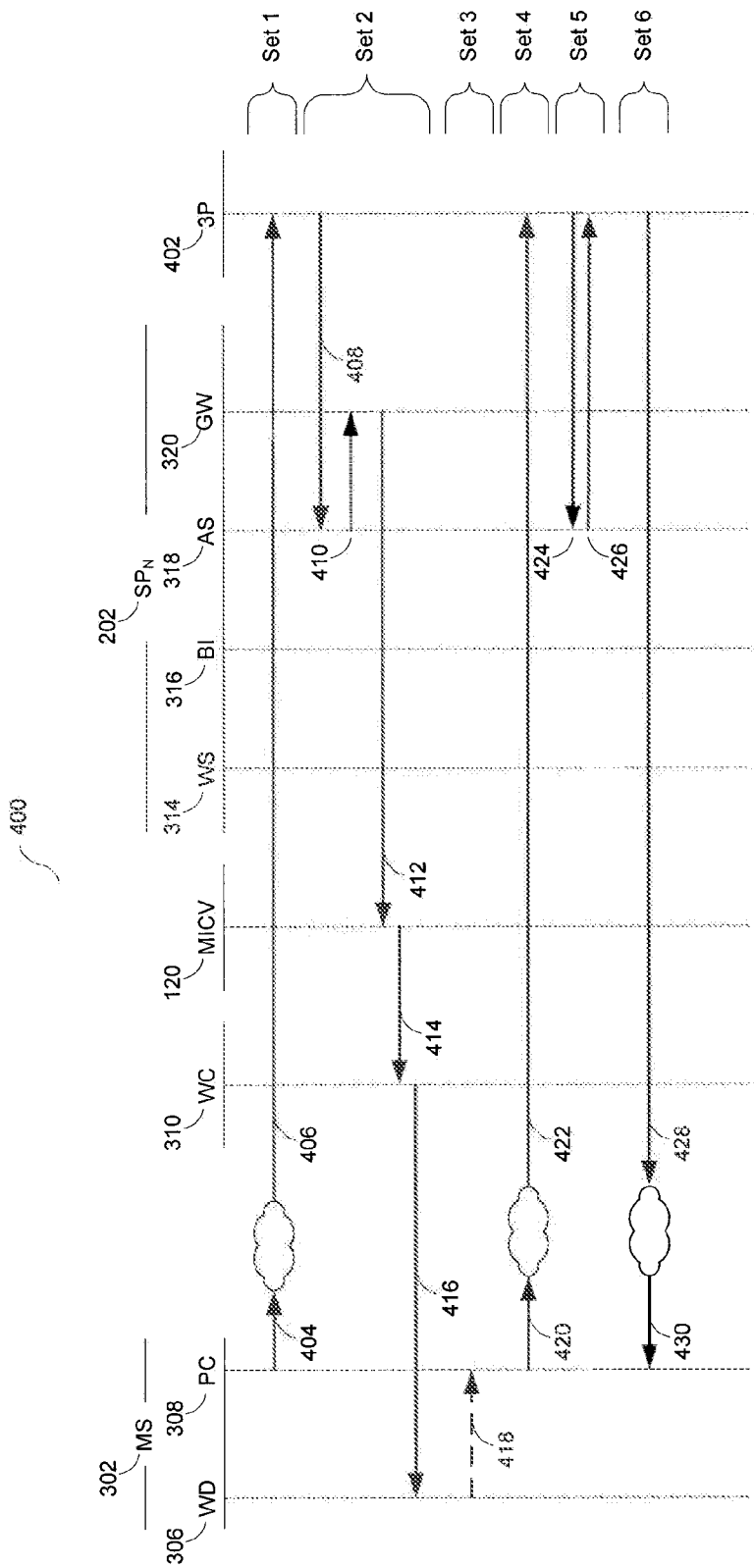
FIG. 4 illustrates various of the exchanges or interactions that are supported by aspects of the present invention.

FIG. 4 and reference numeral 400 provide a framework within which examples, such those cataloged above and others that would be readily apparent to one of ordinary skill in the relevant art, may be examined vis-à-vis aspects of the present invention. The entities that are depicted in FIG. 4 are the same as were depicted in, and described for, FIG. 3 with one exception:

Third Party (3P) 402. An organization such as, possibly inter alia, a financial institution, a retail establishment, an on-line retailer, an employer, a utility company, etc. that may possibly inter alia support transactions and which among other things wishes to enhance the security of those transactions through SFA.

In FIG. 4 the exchanges that are collected under the designation Set 1 represent the activities that might take place as Mary 302 employs one of her PCs 308 to initiate, conduct, conclude, etc. an activity with a 3P 402 (see 404→406). During her activity Mary 302 may optionally include information such as access credentials (e.g., user identification and password).

The specific exchanges that were described above (as residing under the designation Set 1) are illustrative only and it will be readily apparent to one of ordinary skill in the relevant art that numerous other exchanges are easily possible and indeed are fully within the scope of the present invention.

In FIG. 4 the exchanges that are collected under the designation Set 2 represent the activities that might take place as 3P 402 completes a range of internal processing activities including possibly inter alia validating any supplied information (such as for example access credentials), determining the need for SFA, etc. During its processing activities 3P 402 may among other things possibly leverage:

1) One or more repositories containing information about Mary 302 (e.g., as previously collected during a registration process, as previously received from one or more external entities, etc.).

2) A body of dynamically updateable configuration information or data (for among other things the different types of supported transactions, minimum SFA strength, etc.).

3) Bodies of flexible, extensible, and dynamically configurable logic or rules (capturing among other things the particulars [when, how, etc.] governing the application of SFA).

In instant example, 3P 402 determines that enhanced security through SFA is appropriate and possibly among other things issues a request for SFA to an AS 318 of $SP_N$ 202 (see 408). Such a request may employ among other things any combination of one or more of possibly inter alia an API, an interface layer, an abstraction layer, communication protocols, Extensible Markup Language (XML) documents, etc. and may include among other things information about Mary 302 (such as for example identifier, access credentials, the address [e.g., TN] of her WD 306, etc.), the particulars (e.g., strength, etc.) of the desired SFA, etc.

AS 318 of $SP_N$ 202 may complete a range of internal processing activities (which will be described more fully below) to among other things generate a SFA token. A SFA token may be of any length; may consist of any sequence of characters (e.g., letters, numbers, special symbols, etc.); and may be generated randomly, be derived from a predefined algorithm or formula, be generated sequentially from an internal base value (e.g., monotonically increasing), etc.; may be based on or otherwise derived from some element of user (e.g., Mary 302) information; etc. As just one possible example, FIG. 6 and reference numeral 600 present an illustrative Java programming language code sample 602 that supports the generation of a random SFA token of specified size.

A generated SFA token may be preserved in one or more repositories within $SP_N$ 202 where, possibly inter alia, a SFA token may be associated with various indicators or identifiers (indicative of for example Mary 302).

A generated SFA token may be directed to a GW 320 of $SP_N$ 202 (see 410) where one or more (SMS, MMS, etc.) notification messages, containing possibly inter alia the SFA token, may be dispatched to a WD 306 of Mary 302 (see 412→416).

The specific exchanges that were described above (as residing under the designation Set 2) are illustrative only and it will be readily apparent to one of ordinary skill in the relevant art that numerous other exchanges are easily possible and indeed are fully within the scope of the present invention. For example, among other things:

1) $SP_N$ 202 may obtain the address (e.g., the TN) of the WD 306 of Mary 302 through any number of means including, for example, from 3P 402 (as described above during a request for SFA), from one or more repositories within $SP_N$ 202 (possibly leveraging registration information that was provided by Mary 302 and which was supplied to $SP_N$ 202 either directly or indirectly), etc.

2) in any dispatched notification messages $SP_N$ 202 may employ any number of addresses (including, possibly inter alia, a SC, a TN, etc.) to which it would ask users to direct any reply messages.

3) $SP_N$ 202 may optionally alert 3P 402 (and/or one or more other entities) to the generation of a SFA token and the dispatch of one or more (SMS, MMS, etc.) notification messages.

4) $SP_N$ 202 may optionally convey the SFA token to 3P 402 (so that possibly inter alia 3P 402 may preserve the SFA token within its environment).

5) A dispatched notification message may optionally contain, possibly inter alia, descriptive or explanatory text, confirmation information, contact information, a request to call (e.g., a help center) at a particular TN, etc.

6) Mary 302 may optionally reply to one or more of the received (SMS, MMS, etc.) notification messages. Based on any received replies $SP_N$ 202 may optionally complete one or more additional processing steps.

In FIG. 4 the exchanges that are collected under the designation Set 3 represent the activities that might take place as Mary 302 employs the received SFA token. Mary 302 may use any combination of a range of manual (e.g., hand or manual entry), wired (e.g., Universal Serial Bus [USB], docking station, adapter, etc.), wireless (e.g., Near Field Communication [NFC], InfraRed [IR], Bluetooth, etc.), etc. data transfer or data exchange mechanisms to employ (see 418) the SFA token.

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 4 the exchanges that are collected under the designation Set 4 represent the activities that might take place as Mary 302 employs one of her PCs 308 to continue, resume, etc. her activity (now augmented with the SFA token that she received on her WD 306) with a 3P 402 (see 420→422 with appropriate returns).

The specific exchanges that were described above (as residing under the designation Set 4) are illustrative only and it will be readily apparent to one of ordinary skill in the relevant art that numerous other exchanges are easily possible and indeed are fully within the scope of the present invention. For example, the exchange 420→422, with appropriate returns, may be repeated any number of times.

In FIG. 4 the exchanges that are collected under the designation Set 5 represent the activities that might take place as 3P 402 optionally completes one or more internal processing activities including, possibly inter alia, querying $SP_N$ 202 (see 424) to among other things validate the SPA token that 3P 402 received from Mary 302. AS 318 of $SP_N$ 202 may complete a range of internal processing activities (which will be described more fully below) before responding (see 426) to 3P 402 with possibly inter alia an indication of the validity of the submitted SFA token. A query (see 424) and a response (see 426) may among other things employ any combination of one or more of possibly inter alia an API, an interface layer, an abstraction layer, communication protocols, XML documents, etc.

The specific exchanges that were described above (as residing under the designation Set 5) are illustrative only and it will be readily apparent to one of ordinary skill in the relevant art that numerous other exchanges are easily possible and indeed are fully within the scope of the present invention.

In FIG. 4 the exchanges that are collected under the designation Set 6 represent the activities that might take place as 3P 402 continues, concludes, etc. the activity with Mary 302 (see 428→430 with appropriate returns).

The specific exchanges that were described above (as residing under the designation Set 6) are illustrative only and it will be readily apparent to one of ordinary skill in the relevant art that numerous other exchanges are easily possible and indeed are fully within the scope of the present invention. For example, the exchange 428→430, with appropriate returns, may be repeated any number of times.

The Set 1, Set 2, Set 3, Set 4, Set 5, and Set 6 exchanges that were described above are illustrative only and it will be readily apparent to one of ordinary skill in the relevant art that numerous other exchanges are easily possible and indeed are fully within the scope of the present invention. For example:

1) A MS may optionally need to acknowledge a response message (by, for example, replying to same) to activate or otherwise confirm a SFA token. Such an acknowledgement may optionally need to occur within a defined period of time (after which an unacknowledged SFA token may, possibly inter alia, go 'stale' and not be usable).

2) A SFA token may optionally be designated as being single-use, multi-use, etc.

3) A SPA token may optionally carry a lifetime indicator. Such a value may identify a specific period of time (e.g., from a beginning date and time to an ending date and time) during which a SFA token may be usable; identify a specific number of uses or invocations (e.g., 1) after which a SFA token may go 'stale' and not be usable; identify a cumulative transaction amount (e.g., in a currency such as dollars) beyond which a SFA token may go 'stale' and not be usable; etc.

4) A SP may incorporate additional factors, criteria, tests, etc. during various of its processing activities (e.g., the confirmation, authentication, etc. of a SFA token; etc.) including possibly inter alia MS Location-Based Service (LBS) and/or Global Positioning System (GPS) information, biometric information, etc.

5) During its different activities an SP may complete any number of billing, reporting, etc. transactions.

6) An SP may track a MS' usage, aggregate same, optionally offer (to the MS, to external entities such as a 3P, etc.) discounts, rebates, surcharges, etc. based on the tracked usage, etc.

7) During its processing steps an AS may employ any combination of a number of automated (e.g., through software solutions) and/or manual (e.g., through human intervention) actions, techniques, capabilities, etc. and each of the techniques, strategies, capabilities, etc. that were described above may have associated with it, possibly inter alia, an optional set of weighting, scoring, confidence, etc. factors that may be used, either individually or together, to develop results.

The catalog of processing steps, activities, etc. that was described above is illustrative only and it will be readily apparent to one of ordinary skill in the relevant art that numerous other processing steps, activities, etc. are easily possible and indeed are fully within the scope of the present invention.

The confirmation, response, etc. message(s) that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a LBS, GPS, etc. facility).

The confirmation, response, etc. message(s) that were identified above may optionally contain advertising—e.g., textual material if an SMS model is being utilized, or multimedia (images of brand logos, sound, video snippets, etc.) material if an MMS model is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS, GPS, etc. facility).

The confirmation, response, etc. message(s) that were identified above may optionally contain promotional materials (e.g., still images, video clips, etc.).

Figure 5:
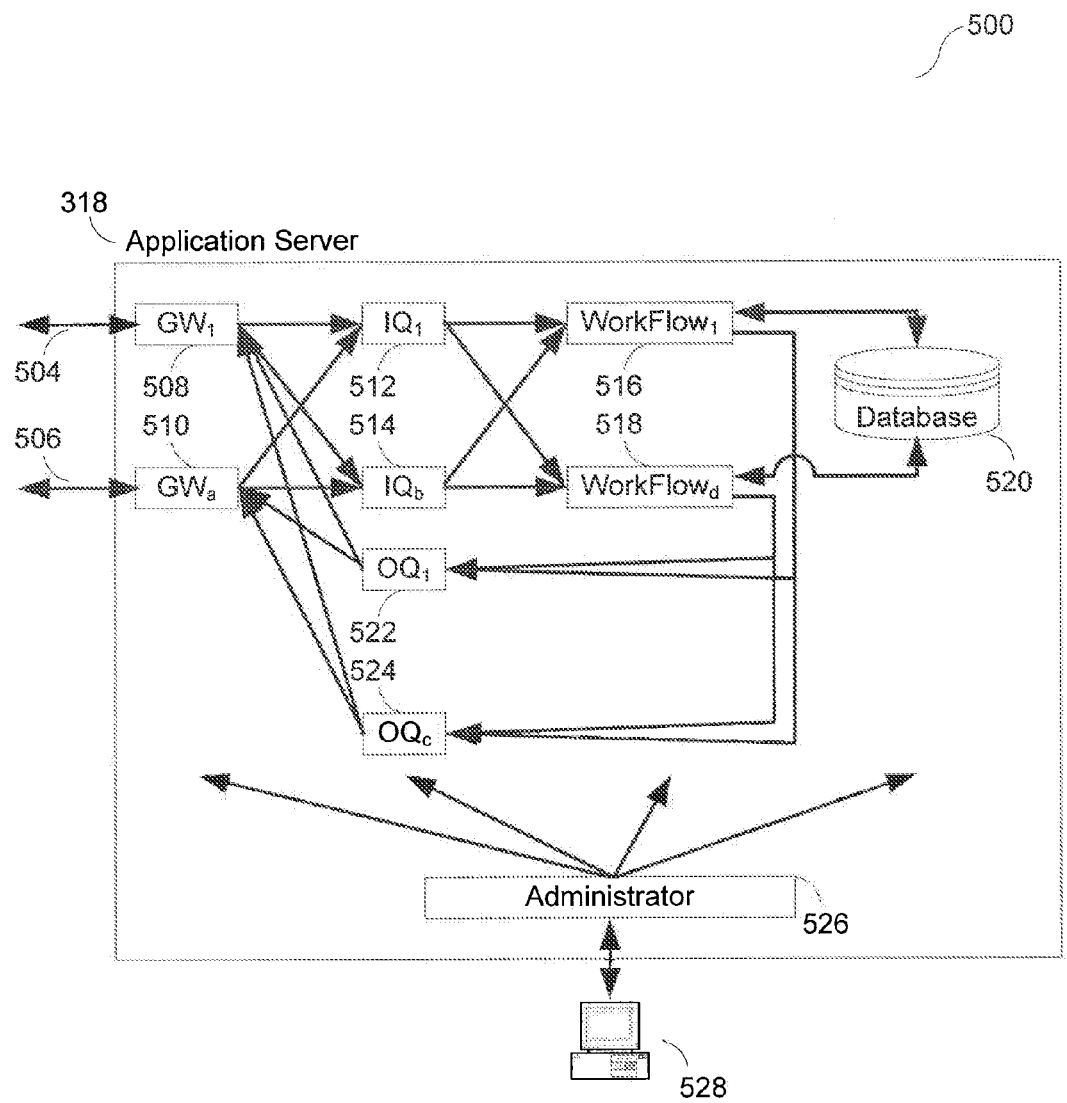
FIG. 5 is a diagrammatic presentation of aspects of an exemplary Service Provider (SP) Application Server (AS).

FIG. 5 and reference numeral 500 provides a diagrammatic presentation of aspects of an exemplary SP AS 318. The illustrated AS 318 contains several key components—Gateways ($GW_1$ 508→$GW_a$ 510 in the diagram), Incoming Queues ($IQ_1$ 512→$IQ_b$ 514 in the diagram), WorkFlows ($WorkFlow_1$ 516→$WorkFlow_d$ 518 in the diagram), Database 520, Outgoing Queues ($OQ_1$ 522→$OQ_c$ 524 in the diagram), and an Administrator 526. It will be readily apparent to one of ordinary skill in the relevant art that numerous other components are possible within an AS 318.

A dynamically updateable set of one or more Gateways ($GW_1$ 508→$GW_a$ 510 in the diagram) handle incoming (SMS/MMS/etc. messaging, etc.) traffic 504→506 and outgoing (SMS/MMS/etc. messaging, etc.) traffic 504→506. A GW may support the receipt of incoming traffic 504→506 and the dispatch of outgoing traffic 504→506 via any combination of one or more of the available public and/or proprietary messaging paradigms including possibly inter alia Short Message Peer-to-Peer (SMPP), Computer Interface to Message Distribution (CIMD), External Machine interface (EMI)/Universal Computer Protocol (UCP), Signaling System Seven (SS7) Mobile Application Part (MAP), MM4, MM7, etc.

Incoming traffic 504→506 is accepted and deposited on an intermediate or temporary Incoming Queue ($IQ_1$ 512→$IQ_b$ 514 in the diagram) for subsequent processing. Processed artifacts are removed from an intermediate or temporary Outgoing Queue ($OQ_1$ 522→$OQ_c$ 524 in the diagram) and then dispatched 504→506.

A dynamically updateable set of one or more Incoming Queues ($IQ_1$ 512→$IQ_b$ 514 in the diagram) and a dynamically updateable set of one or more Outgoing Queues ($OQ_1$ 522→$OQ_c$ 524 in the diagram) operate as intermediate or temporary buffers for incoming 504→506 and outgoing traffic 504→506.

A dynamically updateable set of one or more WorkFlows ($WorkFlow_1$ 516→$WorkFlow_d$ 518 in the diagram) possibly inter alia remove incoming traffic 504→506 from an intermediate or temporary Incoming Queue ($IQ_1$ 512→$IQ_b$ 514 in the diagram), perform all of the required processing operations, and deposit processed artifacts on an intermediate or temporary Outgoing Queue ($OQ_1$ 522→$OQ_c$ 524 in the diagram). The WorkFlow component will be described more fully below.

The Database 520 that is depicted in FIG. 5 is a logical representation of the possibly multiple physical repositories that may be implemented to support, inter alia, configuration, profile, monitoring, alerting, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

An Administrator 526 that is depicted in FIG. 5 provides management or administrative control over all of the different components of an AS 318 through, as one example, a WWW-based interface 528. It will be readily apparent to one of ordinary skill in the relevant art that numerous other interfaces (e.g., a data feed, an API, etc.) are easily possible.

Through flexible, extensible, and dynamically updatable configuration information a WorkFlow component may be quickly and easily realized to support any number of activities. For example, WorkFlows might be configured to support a registration process; to support interactions with external entities; to support various internal processing steps (as described above) including, possibly inter alia, (1) the evaluation of received request messages, (2) the generation, preservation, etc. of a SFA token (through possibly inter alia application logic such as the illustrative source code snippet 602 presented in FIG. 6), and (3) the generation and dispatch of response messages; to support the validation of a supplied SFA token; to support the generation and dispatch of confirmation, etc. messages; to support various billing transactions; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, messaging, etc. activities may be recorded. Among other things, such a repository may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc, facilities and delivered through SMS, MMS, etc. messages, through E-Mail; through a WWW-based facility; etc.

Figure 7:
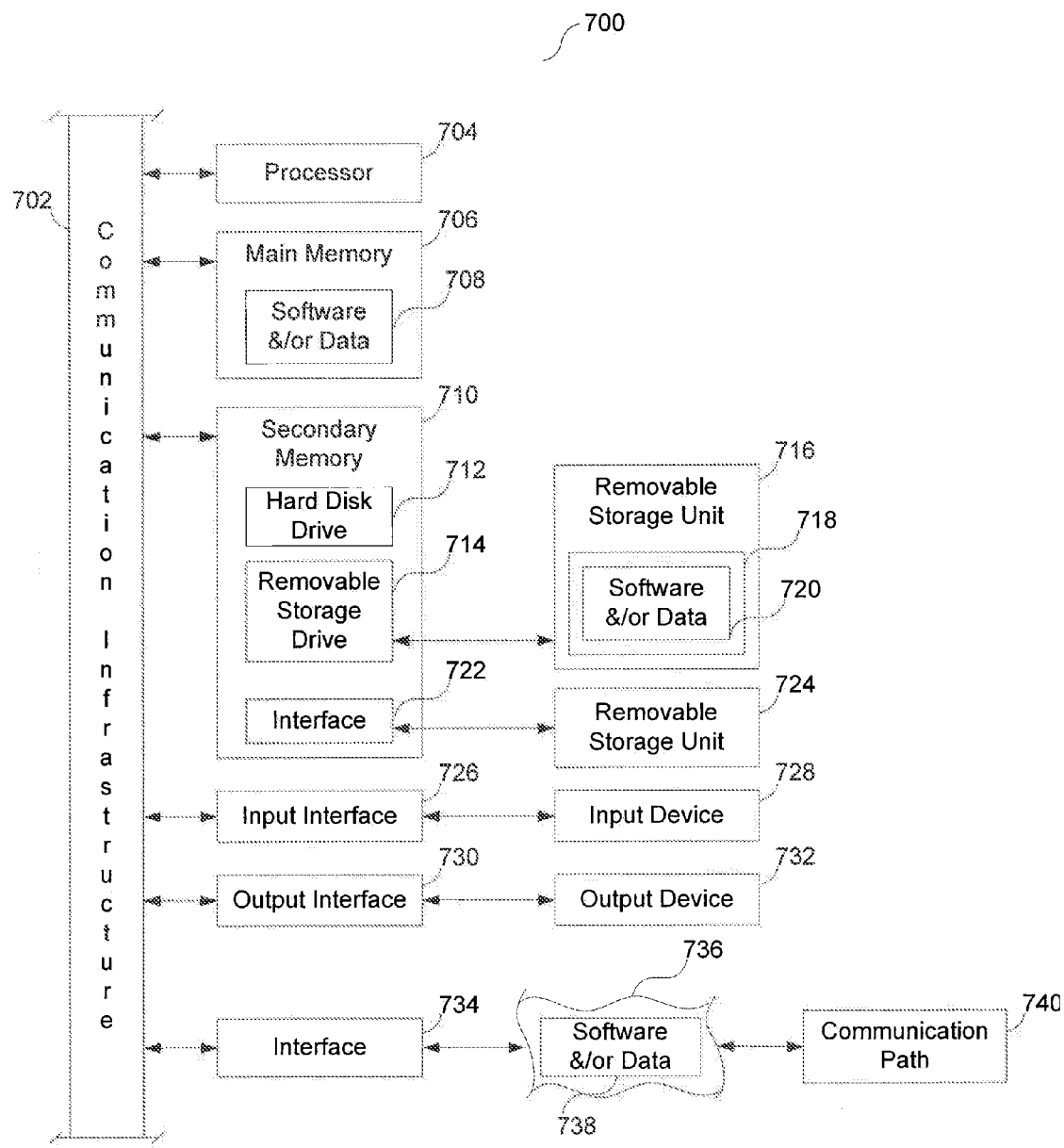
FIG. 7 depicts an example computer system through which embodiments of aspects of the present invention may be implemented.

Various aspects of the present invention can be implemented by software, firmware, hardware, or any combination thereof. FIG. 7 illustrates an example computer system 700 in which the present invention, or portions thereof, (such as described above under paragraphs 37-80, paragraphs 86-116, and paragraphs 121-131) can be implemented as computer-readable code. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose processor or a general purpose processor. Processor 704 is connected to a communication infrastructure 702 (for example, a bus or a network).

Computer system 700 also includes a main memory 706, preferably Random Access Memory (RAM), containing possibly inter alia computer software and/or data 708.

Computer system 700 may also include a secondary memory 710. Secondary memory 710 may include, for example, a hard disk drive 712, a removable storage drive 714, a memory stick, etc. A removable storage drive 714 may comprise a floppy disk drive, a magnetic tape drive, an optical disk drive, a flash memory, or the like. A removable storage drive 714 reads from and/or writes to a removable storage unit 716 in a well known manner. A removable storage unit 716 may comprise a floppy disk, magnetic tape, optical disk, etc. which is read by and written to by removable storage drive 714. As will be appreciated by persons skilled in the relevant art(s) removable storage unit 716 includes a computer usable storage medium 718 having stored therein possibly inter alia computer software and/or data 720.

In alternative implementations, secondary memory 710 may include other similar means for allowing computer programs or other instructions to be loaded into computer system 700. Such means may include, for example, a removable storage unit 724 and an interface 722. Examples of such means may include a program cartridge and cartridge interface (such as that found in video game devices), a removable memory chip (such as an Erasable Programmable Read-Only Memory [EPROM], or Programmable Read-Only Memory [PROM]) and associated socket, and other removable storage units 724 and interfaces 722 which allow software and data to be transferred from the removable storage unit 724 to computer system 700.

Computer system 700 may also include an input interface 726 and a range of input devices 728 such as, possibly inter alia, a keyboard, a mouse, etc.

Computer system 700 may also include an output interface 730 and a range of output devices 732 such as, possibly inter alia, a display, one or more speakers, etc.

Computer system 700 may also include a communications interface 734. Communications interface 734 allows software and/or data 738 to be transferred between computer system 700 and external devices. Communications interface 734 may include a modem, a network interface (such as an Ethernet card), a communications port, a Personal Computer Memory Card International Association (PCMCIA) slot and card, or the like. Software and/or data 738 transferred via communications interface 734 are in the form of signals 736 which may be electronic, electromagnetic, optical, or other signals capable of being received by communications interface 734. These signals 736 are provided to communications interface 734 via a communications path 740. Communications path 740 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 716, removable storage unit 724, and a hard disk installed in hard disk drive 712. Signals carried over communications path 740 can also embody the logic described herein. Computer program medium and computer usable medium can also refer to memories, such as main memory 706 and secondary memory 710, which can be memory semiconductors (e.g. Dynamic Random Access Memory [DRAM] elements, etc.). These computer program products are means for providing software to computer system 700.

Computer programs (also called computer control logic) are stored in main memory 706 and/or secondary memory 710. Computer programs may also be received via communications interface 734. Such computer programs, when executed, enable computer system 700 to implement the present invention as discussed herein. In particular, the computer programs, when executed, enable processor 704 to implement the processes of aspects of the present invention, such as the steps discussed above under paragraphs 37-74, paragraphs 84-116, and paragraphs 121-131. Accordingly, such computer programs represent controllers of the computer system 700. Where the invention is implemented using software, the software may be stored in a computer program product and loaded into computer system 700 using removable storage drive 714, interface 722, hard drive 712 or communications interface 734.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory [CD-ROM] disks, Zip disks, tapes, magnetic storage devices, optical storage devices, Microelectromechanical Systems [MEMS], nanotechnological storage device, etc.), and communication mediums (e.g., wired and wireless communications networks, local area networks, wide area networks, intranets, etc.).

It is important to note that while aspects of the discussion that was presented above referenced the use of SCs and TNs it will be readily apparent to one of ordinary skill in the relevant art that other address identifiers (such as, for example, Session Initiation Protocol [SIP] Address, Uniform Resource Locator [URL], etc.) are equally applicable and, indeed, are fully within the scope of the present invention.

The discussion that was just presented referenced two specific wireless messaging paradigms—SMS and MMS. Those paradigms potentially offer an incremental advantage over other paradigms in that native support for SMS and/or MMS is commonly found on a WD that a potential MS would be carrying. However, it is to be understood that it would be readily apparent to one of ordinary skill in the relevant art that numerous other paradigms (such as, for example, Internet Protocol [IP] Multimedia Subsystem [IMS], IM, EMail, Wireless Application Protocol [WAP], etc.) are fully within the scope of the present invention.

It is important to note that the hypothetical example that was presented above, which was described in the narrative and which was illustrated in the accompanying figures, is exemplary only. It is not intended to be exhaustive or to limit the invention to the specific forms disclosed. It will be readily apparent to one of ordinary skill in the relevant art that numerous alternatives to the presented example are easily possible and, indeed, are fully within the scope of the present invention.

The following acronyms are employed in this disclosure:

| Acronym | Meaning |
| --- | --- |
| API | Application Programming Interface |
| AS | Application Server |
| BI | Billing Interface |
| CD-ROM | Compact Disc Read-Only Memory |
| CIMD | Computer Interface to Message Distribution |
| CIMIP | Center for Identity Management and Information Protection |
| CSC | Common Short Code |
| DBMS | Database Management System |
| DRAM | Dynamic Random Access Memory |
| E-Mail | Electronic Mail |
| EMI | External Machine Interface |
| EPROM | Erasable Programmable Read-Only Memory |
| GIS | Geographic Information System |
| GPS | Global Positioning System |
| GW | Gateway |
| IM | Instant Messaging |
| IMS | IP Multimedia Subsystem |
| IP | Internet Protocol |
| IQ | Incoming Queue |
| IR | Infrared |
| IVR | Interactive Voice Response |
| LBS | Location-Based Service |
| MAP | Mobile Application Part |
| MEMS | Microelectromechanical Systems |
| MICV | Messaging Inter-Carrier Vendor |
| MMS | Multimedia Message Service |
| MS | Mobile Subscriber |
| NFC | Near Field Communication |
| ODBMS | Object Database Management System |
| OQ | Outgoing Queue |
| PC | Personal Computer |
| PCMCIA | Personal Computer Memory Card International Association |
| PROM | Programmable Read-Only Memory |
| RAM | Random Access Memory |
| RDBMS | Relational Database Management System |
| RF | Radio Frequency |
| SC | Short Code |
| SFA | Second Factor Authentication |
| SIP | Session Initiation Protocol |
| SMPP | Short Message Peer-to-Peer |
| SMS | Short Message Service |
| SP | Service Provider |
| SS7 | Signaling System Seven |
| 3P | Third Party |
| TN | Telephone Number |
| UCP | Universal Computer Protocol |
| URL | Uniform Resource Locator |
| USB | Universal Serial Bus |
| WAP | Wireless Application Protocol |
| WC | Wireless Carrier |
| WD | Wireless Device |
| WF | Workflow |
| WS | Web Server |
| WWW | World-Wide Web |
| XML | Extensible Markup Language |

What is claimed is:

1. A method of communication, comprising:
   receiving a request for second factor authentication (SFA) from a third party wherein the request for SFA contains information regarding a user and a desired characteristic of the SFA;
   generating an SFA token based on the received information regarding the user and the desired characteristic of the SFA;
   associating the SFA token with an identifier for the user in a repository;
   sending the generated SFA token to a device associated with the user and to the third party, wherein the third party preserves the SFA token within its environment; and
   communicating with the user using the SFA token,
   wherein at least one of the receiving, generating, associating, and communicating is performed using one or more computers.

2. The method of claim 1, wherein the request contains information that identifies desired characteristics of the SFA.

3. The method of claim 2, wherein the desired characteristic of the SFA comprises dynamically updateable configuration information.

4. The method of claim 2, wherein the desired characteristics include a desired strength of the SFA.

5. The method of claim 1, further comprising obtaining an address for a device associated with the user from the repository using the information regarding the user contained in the request.

6. The method of claim 5, wherein the communicating includes sending a notification message to the address obtained for the device associated with the user.

7. The method of claim 6, wherein the notification message is sent to an additional address associated with the user.

8. The method of claim 1, wherein generating the SFA token comprises deriving at least a portion of the token from information regarding the user.

9. The method of claim 1, further comprising sending a notification to a third party that the SFA token has been generated.

10. The method of claim 1, wherein the desired characteristic of the SFA comprises a strength of the SFA.

11. The method of claim 1, wherein the desired characteristic of the SFA comprises an indication of whether the SFA is single-use or multi-use.

12. A system, comprising:
   one or more gateways configured to receive a request for second factor authentication (SFA) from a third party, wherein the request for SFA contains information regarding a user and a desired characteristic of the SFA;
   a workflow component configured to generate an SFA token based on the information regarding the user and the desired characteristic of the SFA;
   a repository configured to associate the SFA token with an identifier for the user; and
   wherein at least one of the one or more gateways is configured to:
      send the SFA token to a device associated with the user and to the third party, wherein the SFA token is configured to be preserved by the third party within its environment, and
      communicate with the user using the SFA token.

13. The system of claim 12, wherein the request contains information that identifies desired characteristics of the SFA.

14. The system of claim 13, wherein the workflow component is the desired characteristic of the SFA comprises dynamically updateable configuration information.

15. The system of claim 13, wherein the desired characteristics include a desired strength of the SFA.

16. The system of claim 12, wherein the repository is configured to store an address for a device associated with the user such that the address is retrievable using the information regarding the user contained in the request.

17. The system of claim 16, wherein the at least one of the one or more gateways is further configured to send a notification message to the address stored in the repository.

18. The system of claim 17, wherein the at least one of the one or more gateways is further configured to send the notification message to an additional address associated with the user.

19. The system of claim 12, wherein the work flow component is configured to generate the SFA token by deriving at least a portion of the token from information regarding the user.

20. The system of claim 12, wherein the at least one of the one or more gateways is further configured to send a notification to a third party that the SFA token has been generated.

21. A non-transitory computer readable medium containing computer instructions that, when executed by one or more processors, cause the one or more processors to take actions, comprising:
   receiving a request for second factor authentication (SFA) from a third party, wherein the request for SFA contains information regarding a user and a desired characteristic of the SFA;
   generating an SFA token based on the received information regarding the user and desired characteristic of the SFA;
   sending the generated SFA token to a device associated with the user and to the third party, wherein the third party preserves the SFA token within its environment;
   associating the SFA token with an identifier for the user in a repository; and
   communicating with the user using the SFA token.

\* \* \* \* \*